United States Patent [19]

Arai

[11] Patent Number: 4,773,746
[45] Date of Patent: Sep. 27, 1988

[54] READING LENS SYSTEM

[75] Inventor: Yasunori Arai, Tokyo, Japan

[73] Assignee: Asahi Kogaku Kogyo Kabushiki Kaisha, Tokyo, Japan

[21] Appl. No.: 134,114

[22] Filed: Dec. 17, 1987

[30] Foreign Application Priority Data

Dec. 18, 1986 [JP] Japan ................................ 61-302980

[51] Int. Cl.$^4$ ............................................. G02B 9/60
[52] U.S. Cl. ................................................... 350/466
[58] Field of Search ................ 350/463, 464, 465, 466

[56] References Cited

U.S. PATENT DOCUMENTS

| | | | |
|---|---|---|---|
| 2,831,397 | 4/1958 | Berger et al. | 350/466 |
| 2,896,506 | 7/1959 | Azuma | 350/466 |
| 2,959,102 | 11/1960 | Cook | 350/466 |
| 2,959,104 | 11/1960 | Cook | 350/466 |
| 2,983,192 | 5/1961 | Cook | 350/466 X |
| 3,357,774 | 12/1967 | Becker | 350/466 |
| 3,560,079 | 2/1971 | Wakimoto et al. | 350/466 |
| 3,815,974 | 6/1974 | Momiyama | 350/466 |
| 3,912,359 | 10/1975 | Uetake et al. | 350/466 X |

Primary Examiner—John K. Corbin
Assistant Examiner—Scott J. Sugarman
Attorney, Agent, or Firm—Sughrue, Mion, Zinn, Macpeak & Seas

[57] ABSTRACT

A reading lens system, such as may be used in a facsimile machine or the like, having a small size, low cost, high performance and a large aperture ratio of 1:3.2 to 1:3.5 and a half angle of 22.5° or more. The lens includes, in order from the object side, a first lens element which is a positive meniscus lens having its convex surface directed toward the object side, a second lens element which is a positive meniscus lens having its convex surface directed toward the object side, a third lens element which is a negative meniscus lens having its convex surface directed toward the object wide, a fourth lens element which is a negative meniscus lens having its concave surface directed toward the object side, a fifth lens element having its concave surface directed toward the object side, and a sixth lens element which is a positive lens. The second and third lens elements are cemented to make the overall system a five-unit six-element lens configuration. The lens system satisfies $$0.6 < |f_4|/f < 1.20, (f_4 < 0),$$

where f is the composite focal length of the overall system and $f_4$ is the focal length of the fourth lens element.

4 Claims, 5 Drawing Sheets

READING LENS SYSTEM

BACKGROUND OF THE INVENTION

The present invention relates to a reading lens system, and, more particularly, to a small-size, high-performance, large-aperture and wide-angle reading lens system suitable for use in a facsimile machine, an image scanner, a micro film machine, etc.

In order to attain a high resolution of the order of 7 to 10 μm on the image side, lenses used in facsimile machine, image scanners, micro film machines, etc., are required to provide a high contrast ratio at high spatial frequencies. In addition, such lenses must have an aperture efficiency close to 100% in order to minimize the decrease in the quantity of marginal light. It is also necessary to compensate various aberrations to a satisfactorily small level.

In order to meet all of these requirements, a Gauss-type lens system of the four-unit six-element lens configuration has conventionally been employed in these applications. However, the Gauss-type lens system has a large amount of comatic flare at middle-angle positions and can achieve an aperture ratio only of the order of 1:4. The demand for reducing the size of the overall lens system is always present, and there is also a strong need to shorten the focal length to accommodate wider viewing angles. However, the Gauss-type lens system has a sudden increase in field curvature for half viewing angles exceeding about 20°.

A reading lens system could be designed as a wide-angle lens system in which a negative lens is disposed as the outer member of the system. This type of lens system would have a wide viewing angle but, on the other hand, the length and the outside diameter of the lens system become unduly great and the aperture ratio that can be achieved is still only the order of 1:4.

Cost reduction is another important requirement for modern lens system employed in facsimile machines, image scanners, micro film machines, etc., and hence efforts to increase the aperture ratio and to improve the lens performance cannot be made without considering the need to reduce the number of lens components to the necessary minimum level.

SUMMARY OF THE INVENTION

An object, therefore, of the present invention is to provide a small-size low-cost and high-performance reading lens system that features a larger aperture ratio of 1:3.2 to 1:3.5 and a half viewing angle of 22.5° or more.

In satisfaction of the above and other objects, the reading lens system of the present invention comprises, in order from the object side, a first lens element which is a positive meniscus lens having its convex surface directed toward the object side, a second lens element which is a positive meniscus lens having its convex surface directed toward the object side, a third lens elements which is a negative meniscus lens having its convex surface directed toward the object side, a fourth lens element which is a negative meniscus lens having its concave surface directed toward the object side, a fifth lens element having its concave surface directed toward the object side, and a sixth lens element which is a positive lens. The second and third lens elements are cemented to make the overall system a five-unit six-element lens configuration, wherein a unit consists of one or more lens elements and wherein the system satisfies the following condition:

$$0.60 < |f_4|/f < 1.20, (f_4 < 0). \quad (1)$$

In a preferred embodiment, the reading lens system of the present invention satisfies the following additional conditions:

$$1.65 < \frac{n_1 + n_2 + n_5 + n_6}{4} \quad (2)$$

$$\frac{v_3 + v_4}{2} < 35 \quad (3)$$

$$1.20 < \frac{|f_{23}|}{f} < 3.00, (f_{23} < 0). \quad (4)$$

In a more preferred embodiment, the reading lens system of the present invention further satisfies the following additional conditions:

$$0.20 < \frac{|r_6|}{f} < 0.35, (r_6 < 0) \quad (5)$$

$$0.30 < \frac{|r_9|}{f} < 0.45, (r_9 < 0) \quad (6)$$

$$1.0 < \frac{f_6}{f} < 1.8. \quad (7)$$

The symbols used in (1) to (7) have the following definitions:
- f: the composite focal length of overall system;
- $f_i$: the focal length of an ith lens element;
- $n_i$: the refractive index of the optical material of an ith lens element;
- $v_i$: the Abbé number of the optical material of an ith lens element.
- $f_{ij}$: the composite focal length of the combination of ith to the jth lens elements; and
- $r_i$: the radius of curvature of an ith lens surface as counted from the object side.

DESCRIPTION OF THE PREFERRED EMBODIMENTS

Figure 1:
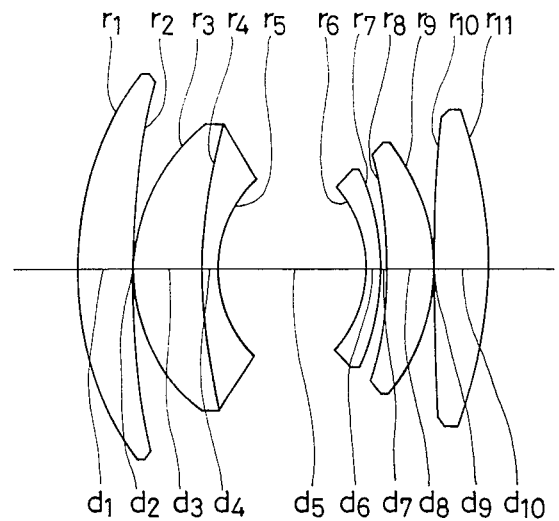
FIGS. 1, 3, 5, 7 and 9 are simplified cross-sectional views of the lens systems of Examples 1 to 5, respectively, of the present invention.
Figure 2:
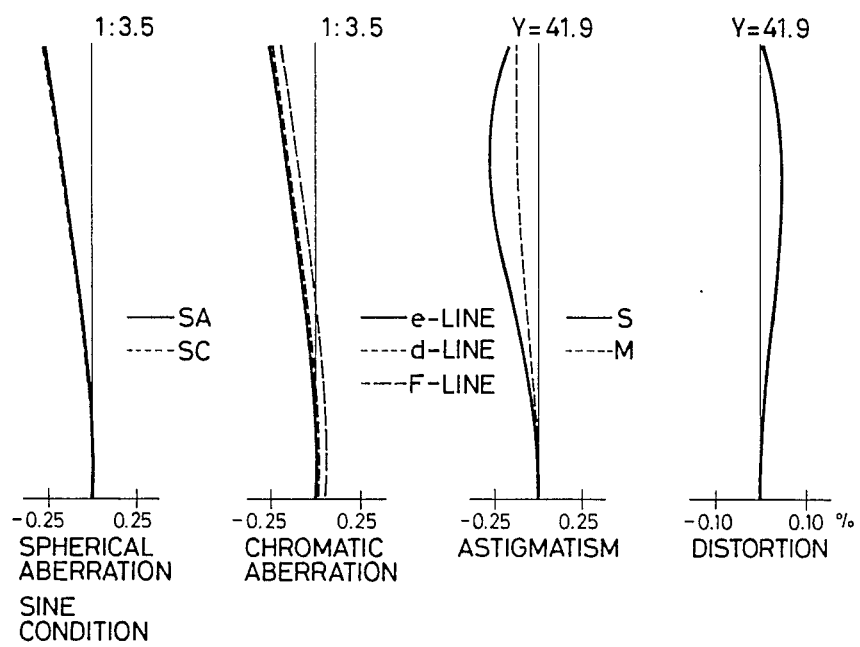
FIGS. 2, 4, 6, 8 and 10 are graphs of aberration curves for the lens systems of Examples 1 to 5.
Figure 3:
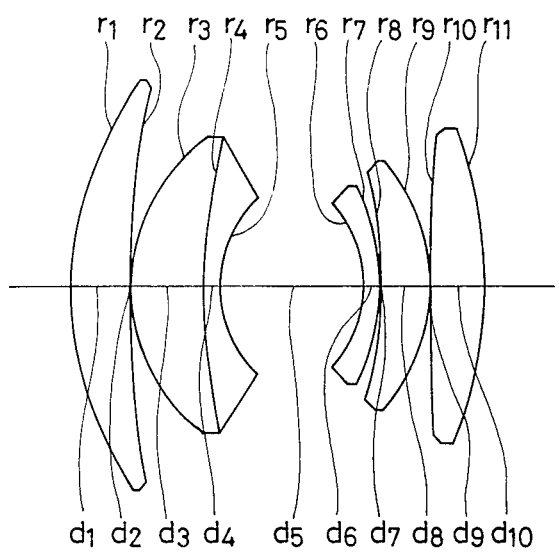
Figure 4:
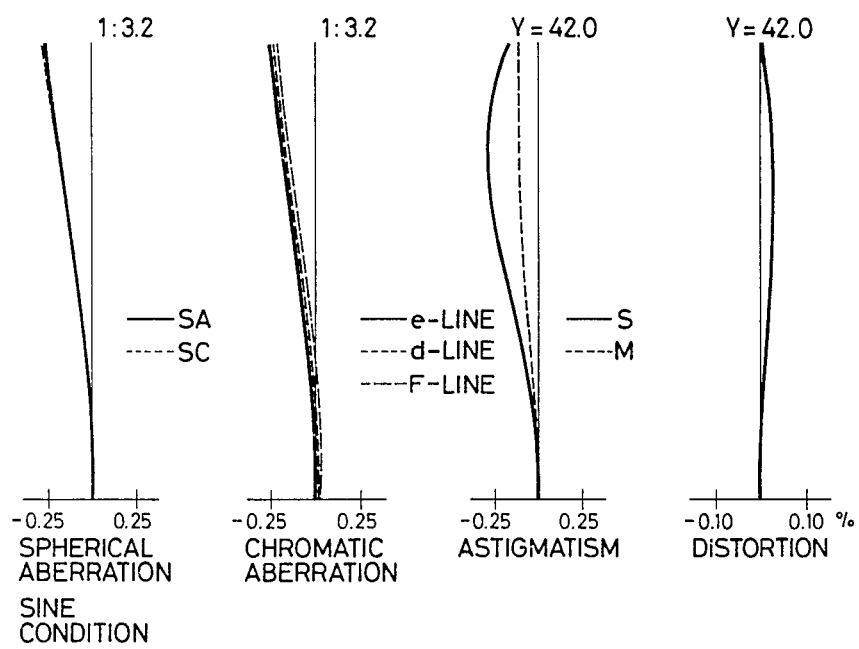
Figure 5:
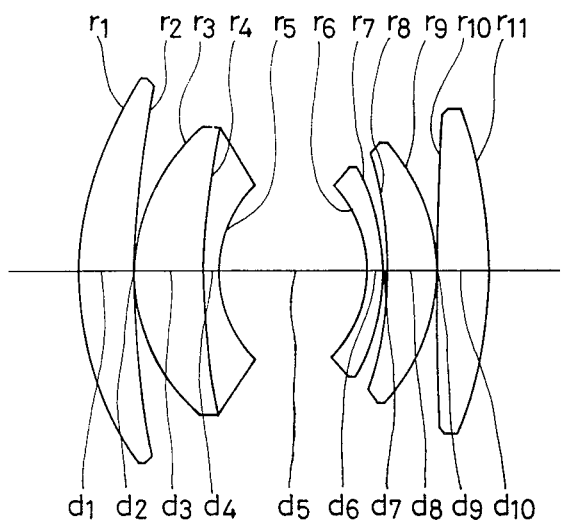
Figure 6:
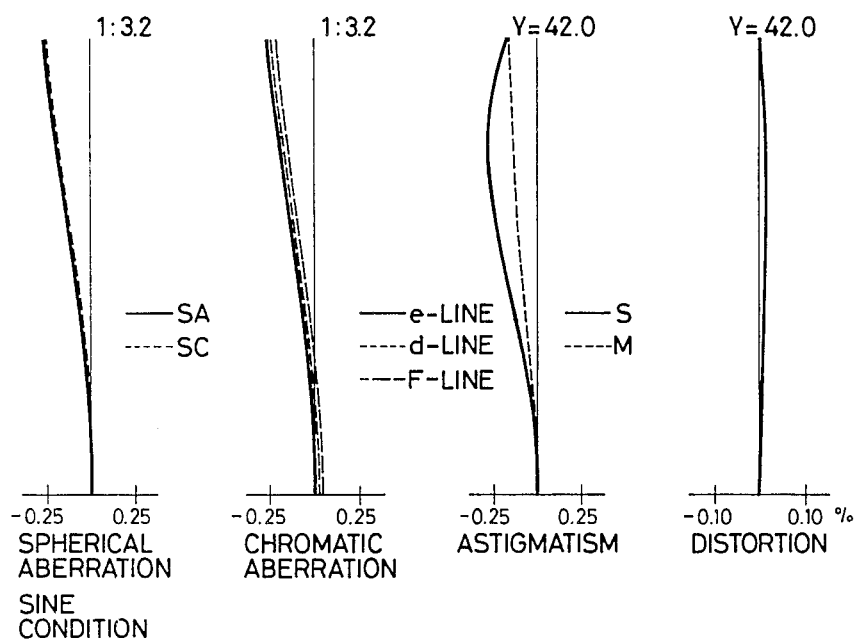
Figure 7:
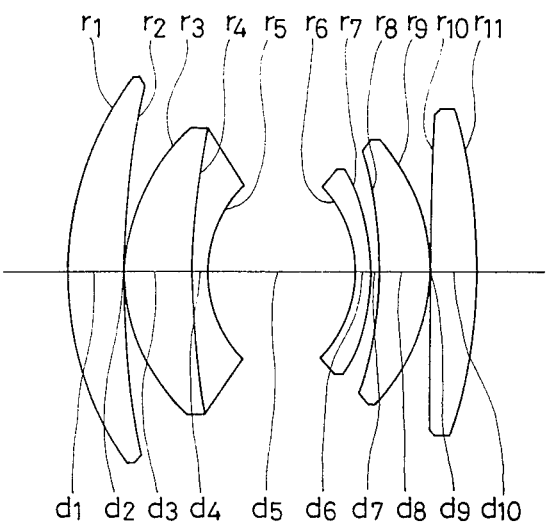
Figure 8:
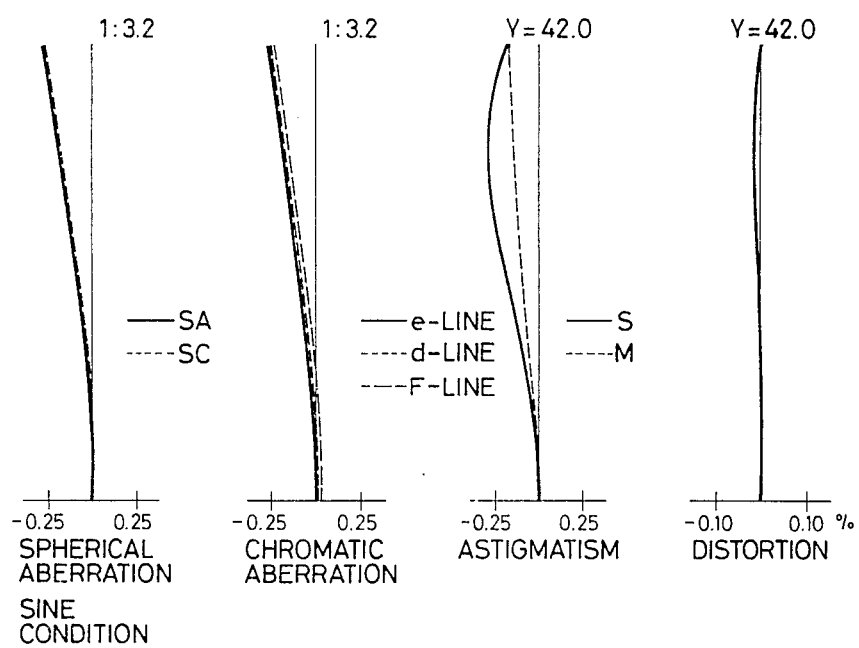
Figure 9:
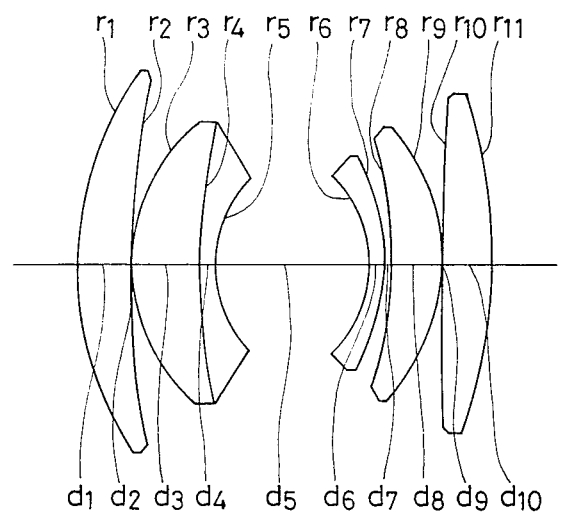
Figure 10:
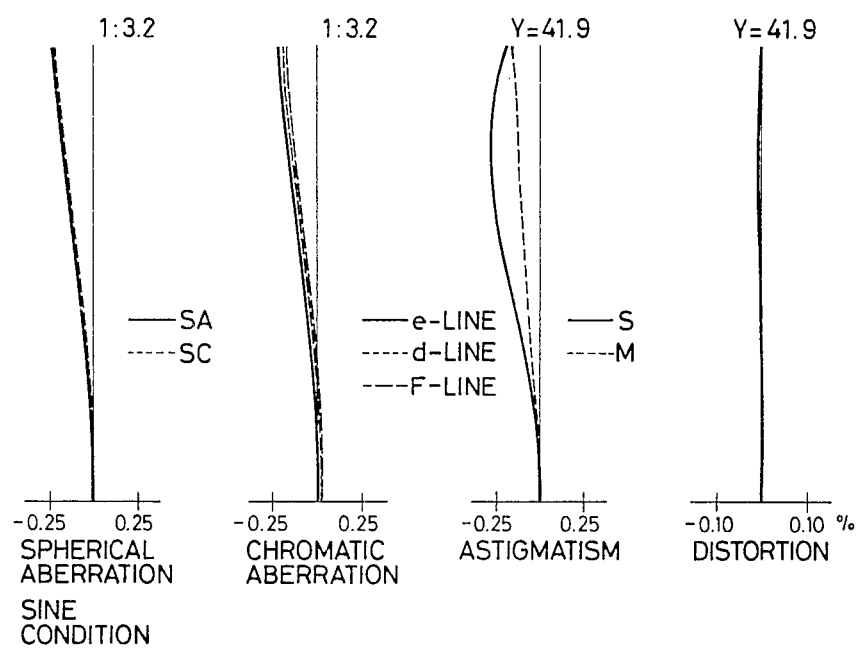

The reading lens system of the present invention successfully achieves a wide angle of viewing angles by separating the cemented lens in the rear group of the prior art Gauss-type (four-unit six-element configuration) lens system into fourth and fifth lens element, and by changing the power distribution in the lenses subsequent to the second and third lens elements.

Condition (1) sets forth a requirement that is most important for the purposes of the present invention. If this condition is satisfied, the absolute value of the power of the fourth lens element is kept smaller than in the prior art Gauss-type lens system, thereby also reducing the power of each of the fifth and sixth lens elements. Although the rear-group lens elements (4th to 6th elements) have such a small power, the lens system of the present invention is capable of achieving effective aberrational compensation. If the upper limit of condition (1) is exceeded, the power of the fourth lens element becomes too small to effectively compensate for the Petzval sum. If the lower limit of condition (1) is not reached, the curvature of the first surface ($r_6$) of the fourth lens element will be so strong that comatic flare is increased the extent that contrast is significantly reduced. Furthermore, a chromatic difference of magnification (i.e., transversal chromatic aberration) is too great to be effectively compensated for by the fifth and sixth lens elements.

Condition (2) sets forth a requirement that should be met in order to keep the Petzval sum small for producing a wide-angle and flat image plane. If this condition is not met, the Petzval sum will be excessive and the field curvature increased, resulting in a failure to ensure a good image-forming performance not only in the central portion but also in the peripheral portions of lenses.

Condition (3) defines a requirement that should be met in order to achieve effective compensation of chromatic aberration. If this condition is not met, compensation of chromatic aberration will be insufficient because the chromatic aberration occurring in the negative third and fourth lens elements cannot be overcompensated to cancel the undercompensated chromatic aberration resultion from the positive first, second, fifth and sixth lens elements.

Condition (4) relates to the composite focal length of the cemented second and third lens elements. Compared with the prior art Gauss-type lens system, in the lens system of the present invention, this cemented lens produces a more negative power. If the upper limit of condition (4) is not reached, the Petzval sum is decreased but, on the other hand, positive distortion or comatic aberration will develop to an excessive amount. If the upper limit of condition (4) is exceeded, field curvature cannot be effectively compensated.

Condition (5) relates to a requirement that should be met in order to achieve effective compensation for spherical and comatic aberrations. If the upper limit of this condition is exceeded, comatic flare will be decreased but, on the other hand, undercompensation of spherical aberration occurs. If the lower limit of condition (5) is not reached, a strong curvature causes an increased comatic flare with respect to rays of light that are above the principal ray.

Condition (6), in combination with condition (7) discussed below, specifies a requirement that should be met in order to compensate for the overcompensated spherical aberration that occurs at the fifth surface ($r_5$) and the sixth surface ($r_6$). Condition (6) also sets forth the requirement that should be met in order to compensate for the positive distortion that occurs in the rear group (1st to 3rd lens elements). If the upper limit of this condition is exceeded, overcompensation of distortion occurs. If the lower limit of condition (6) is not reached, excessive undercompensation of spherical aberration occurs. Therefore, in either case of failing to satisfy condition (6), good aberrational balance is not achieved.

Condition (7) relates to the power of the positive sixth lens element, and sets forth the requirement that should be met in order to achieve a good balance between chromatic aberration and field curvature correction. If the upper limit of this condition is exceeded, the Petzval sum is decreased but the chromatic magnification difference occurring in the front group is insufficiently compensated. If the lower limit of condition (7) is not reached, the Petzval sum is increased, causing a further failure to achieve a balance between the chromatic magnification difference and field curvature correction.

EXAMPLES 1

$F_{NO} = 1:3.5$  $F = 100.00$  $M = -0.112$
$\omega = 22.5°$  $f_B = 55.18$

| Surface No. | r | d | n | $\nu$ |
|---|---|---|---|---|
| 1 | 62.654 | 10.66 | 1.74400 | 44.7 |
| 2 | 170.184 | 0.25 | | |
| 3 | 34.457 | 13.30 | 1.83481 | 42.7 |
| 4 | 100.640 | 3.01 | 1.80518 | 25.4 |
| 5 | 22.360 | 29.25 | | |
| 6 | −24.191 | 3.01 | 1.71736 | 29.5 |
| 7 | −43.154 | 1.20 | | |
| 8 | −79.030 | 9.17 | 1.77250 | 49.6 |
| 9 | −36.449 | 0.25 | | |
| 10 | 421.674 | 10.61 | 1.51633 | 64.1 |
| 11 | −79.989 | | | |

$|f_4|/f = 0.82$  $(n_1 + n_2 + n_5 + n_6)/4 = 1.717$
$(\nu_3 + \nu_4)/2 = 27.45$  $|f_{23}|/f = 2.30$
$|r_6|/f = 0.24$  $|r_9|/f = 0.36$
$f_6/f = 1.31$

EXAMPLES 2

$F_{NO} = 1:3.2$  $F = 100.00$  $M = -0.112$
$\omega = 22.5°$  $f_B = 56.47$

| Surface No. | r | d | n | $\nu$ |
|---|---|---|---|---|
| 1 | 65.849 | 11.39 | 1.74400 | 44.7 |
| 2 | 197.849 | 0.25 | | |
| 3 | 34.980 | 14.26 | 1.79952 | 42.2 |
| 4 | 115.111 | 3.02 | 1.80518 | 25.4 |
| 5 | 22.654 | 28.67 | | |
| 6 | −23.599 | 3.02 | 1.71736 | 29.5 |
| 7 | −41.172 | 0.48 | | |
| 8 | −81.265 | 9.54 | 1.77250 | 49.6 |
| 9 | −35.709 | 0.25 | | |
| 10 | 648.106 | 10.32 | 1.51633 | 64.1 |
| 11 | −79.171 | | | |

$|f_4|/f = 0.82$  $(n_1 + n_2 + n_5 + n_6)/4 = 1.708$
$(\nu_3 + \nu_4)/2 = 27.45$  $|f_{23}|/f = 2.03$
$|r_6|/f = 0.24$  $|r_9|/f = 0.36$
$f_6/f = 1.37$

EXAMPLES 3

$F_{NO} = 1:3.2$  $F = 100.00$  $M = -0.112$
$\omega = 22.5°$  $f_B = 59.57$

| Surface No. | r | d | n | $\nu$ |
|---|---|---|---|---|
| 1 | 61.628 | 10.85 | 1.76200 | 40.1 |
| 2 | 171.810 | 0.25 | | |
| 3 | 35.494 | 13.36 | 1.79952 | 42.2 |
| 4 | 131.257 | 3.02 | 1.80518 | 25.4 |
| 5 | 22.621 | 28.93 | | |
| 6 | −24.213 | 3.02 | 1.74077 | 27.8 |
| 7 | −40.973 | 0.90 | | |
| 8 | −74.569 | 9.49 | 1.77250 | 49.6 |
| 9 | −35.560 | 0.25 | | |
| 10 | 680.606 | 10.16 | 1.55963 | 61.2 |
| 11 | −82.856 | | | |

$|f_4|/f = 0.86$  $(n_1 + n_2 + n_5 + n_6)/4 = 1.723$
$(\nu_3 + \nu_4)/2 = 26.60$  $|f_{23}|/f = 1.71$
$|r_6|/f = 0.24$  $|r_9|/f = 0.36$
$f_6/f = 1.32$

EXAMPLES 4

| $F_{NO} = 1:3.2$ | $F = 100.00$ | $M = -0.112$ | |
|---|---|---|---|
| $\omega = 22.5°$ | $f_B = 61.27$ | | |

| Surface No | r | d | n | ν |
|---|---|---|---|---|
| 1 | 61.514 | 11.08 | 1.74950 | 35.3 |
| 2 | 177.685 | 0.25 | | |
| 3 | 36.058 | 13.41 | 1.79500 | 45.3 |
| 4 | 144.042 | 3.02 | 1.80518 | 25.4 |
| 5 | 22.908 | 29.01 | | |
| 6 | −24.728 | 3.02 | 1.80518 | 25.4 |
| 7 | −39.538 | 1.59 | | |
| 8 | −78.038 | 9.85 | 1.77250 | 49.6 |
| 9 | −36.525 | 0.25 | | |
| 10 | 1576.931 | 9.15 | 1.67790 | 55.3 |
| 11 | −97.664 | | | |

$|f_4|/f = 0.89$  $(n_1 + n_2 + n_5 + n_6)/4 = 1.749$
$(\nu_3 + \nu_4)/2 = 25.4$  $|f_{23}|/f = 1.65$
$|r_6|/f = 0.25$  $|r_9|/f = 0.37$
$f_6/f = 1.35$

EXAMPLES 5

| $F_{NO} = 1:3.2$ | $F = 100.00$ | $M = -0.112$ | |
|---|---|---|---|
| $\omega = 22.5°$ | $f_B = 58.04$ | | |

| Surface No. | r | d | n | ν |
|---|---|---|---|---|
| 1 | 62.689 | 10.66 | 1.74400 | 44.7 |
| 2 | 183.557 | 0.25 | | |
| 3 | 34.754 | 13.20 | 1.80440 | 39.6 |
| 4 | 120.820 | 3.01 | 1.80518 | 25.4 |
| 5 | 22.630 | 29.85 | | |
| 6 | −24.971 | 3.01 | 1.80518 | 25.4 |
| 7 | −41.031 | 1.38 | | |
| 8 | −79.866 | 9.92 | 1.77250 | 49.6 |
| 9 | −37.185 | 0.25 | | |
| 10 | 1015.364 | 9.63 | 1.67790 | 55.3 |
| 11 | −97.552 | | | |

$|f_4|/f = 0.86$  $(n_1 + n_2 + n_5 + n_6)/4 = 1.750$
$(\nu_3 + \nu_4)/2 = 25.4$  $|f_{23}|/f = 1.96$
$|r_6|/f = 0.25$  $|r_9|/f = 0.37$
$f_6/f = 1.31$

As will be understood from the foregoing explanation, the present invention provides a high-performance lens system that employs the same member of lens elements (six elements in five units) as in the prior art Gauss-type system, and which yet attains a bright F number and a wide viewing angle of the order of 15° to 20°.

In addition, the overall length of the lens system is about 0.8 times the focal length, which contributes to a reduction in the outside diameter of the overall system.

Therefore, when the lens system of the present invention is used in a reading optical apparatus or the like, it provides a highly compact, high-performance and low-cost optical system.

What is claimed is:

1. A reading lens system which comprises, in order from the object side, a first lens element which is a positive meniscus lens having a convex surface directed toward the object side, a second lens element which is a postive meniscus lens having a convex surface directed toward the object side, a third lens element which is a negative meniscus lens having a convex surface directed toward the object side, a fourth lens element which is a negative meniscus lens having a concave surface directed toward the object side, a fifth lens element having a concave surface directed toward the object side, and a sixth lens element which is a positive lens, said second and third lens elements being cemented to render the overall system a five-unit six-element lens configuration, said system satisfying the following condition:

$$0.60 < |f_4|/f < 1.20, (f_4 < 0) \quad (1)$$

where f denotes the composite focal length of the overall system, and $f_4$ is the focal length of the fourth lens element.

2. The reading lens system according to claim 1, which satisfies the following additional conditions:

$$1.65 < \frac{n_1 + n_2 + n_5 + n_6}{4} \quad (2)$$

$$\frac{\nu_3 + \nu_4}{2} < 35 \quad (3)$$

$$1.20 < \frac{|f_{23}|}{f} < 3.00, (f_{23} < 0). \quad (4)$$

where $n_i$ signifies the refractive index of the optical material of an ith lens element, $\nu_i$ is the Abbé number of the optical material of an ith lens element, and $f_{23}$ is the composite focal length of the combination of the second and third lens elements.

3. The reading lens system according to claim 1, which satisfies the following additional conditions:

$$0.20 < \frac{|r_6|}{f} < 0.35, (r_6 < 0) \quad (5)$$

$$0.30 < \frac{|r_9|}{f} < 0.45, (r_9 < 0) \quad (6)$$

$$1.0 < \frac{f_6}{f} < 1.8. \quad (7)$$

where $r_i$ signifies the radius of curvature of an ith lens surface as counted from the object side, and $f_6$ is the focal length of the sixth lens element.

4. The reading lens system according to claim 2, which satisfies the following additional conditions:

$$0.20 < \frac{|r_6|}{f} < 0.35, (r_6 < 0) \quad (5)$$

$$0.30 < \frac{|r_9|}{f} < 0.45, (r_9 < 0) \quad (6)$$

$$1.0 < \frac{f_6}{f} < 1.8. \quad (7)$$

where $r_i$ signifies the radius of curvature of an ith lens surface as counted from the object side, and $f_6$ is the focal length of the sixth lens element.

* * * * *